United States Patent
Reynolds et al.

(10) Patent No.: US 8,965,989 B2
(45) Date of Patent: Feb. 24, 2015

(54) INTERACTIVE WEB COLLABORATION SYSTEMS AND METHODS

(71) Applicant: Family Systems, Ltd., Isle of Man (GB)

(72) Inventors: Brian Reynolds, Hanover (JM); Mark J. Conway, Newbury (GB)

(73) Assignee: Family Systems, Ltd., Douglas (IM)

( * ) Notice: Subject to any disclaimer, the term of this patent is extended or adjusted under 35 U.S.C. 154(b) by 0 days.

(21) Appl. No.: 13/933,042

(22) Filed: Jul. 1, 2013

(65) Prior Publication Data

US 2013/0298023 A1    Nov. 7, 2013

Related U.S. Application Data

(63) Continuation of application No. 12/011,332, filed on Jan. 25, 2008, which is a continuation of application No. 10/439,143, filed on May 14, 2003, now Pat. No. 7,571,212.

(60) Provisional application No. 60/381,060, filed on May 14, 2002.

(51) Int. Cl.
| | |
|---|---|
| *G06F 15/173* | (2006.01) |
| *G06F 3/16* | (2006.01) |
| *G06Q 10/10* | (2012.01) |
| *H04L 12/18* | (2006.01) |

(52) U.S. Cl.
CPC ............... *G06F 3/165* (2013.01); *G06Q 10/10* (2013.01); *H04L 12/1822* (2013.01); *H04L 12/1831* (2013.01)
USPC ........................................................ 709/206

(58) Field of Classification Search
None
See application file for complete search history.

(56) References Cited

U.S. PATENT DOCUMENTS

| | | |
|---|---|---|
| 5,721,763 A | 2/1998 | Joseph et al. |
| 5,796,393 A | 8/1998 | MacNaughton et al. |
| 5,809,250 A | 9/1998 | Kisor |
| 5,862,330 A | 1/1999 | Anupam et al. |
| 5,870,744 A | 2/1999 | Sprague |
| 5,878,233 A | 3/1999 | Schloss |

(Continued)

FOREIGN PATENT DOCUMENTS

WO    WO99/44149    9/1999

OTHER PUBLICATIONS de Jesus et al., A design framework for collaborative browsing, Enabling Technologies: Infrastructure for Collaborative Enterprises, WET ICE 2001, Proceedings, 10$^{th}$ IEEE International Workshops, pp. 362-367 (2001).

(Continued)

*Primary Examiner* — Scott B Christensen
(74) *Attorney, Agent, or Firm* — Ropes & Gray LLP

(57) ABSTRACT

A topic room is provided in which one or more individuals or other entities may collaborate on topics of mutual interest. Multiple individuals or participants may use the topic room to communicate in real or non-real time and may work together to create, browse, modify, comment on, and perform any other suitable action on content. A chat room within the topic room receives, records, and transmits the communications and all activity in the topic room to all participants as messages. Client processes at a participant's user equipment may listen to the messages and take particular actions. For example, one participant can follow another participant as that participant browses through material by using the messages received from that participant.

20 Claims, 8 Drawing Sheets

(56) References Cited

U.S. PATENT DOCUMENTS

| | | | |
|---|---|---|---|
| 5,944,791 | A | 8/1999 | Scherpbier |
| 5,991,796 | A | 11/1999 | Anupam et al. |
| 6,052,717 | A * | 4/2000 | Reynolds et al. ............. 709/218 |
| 6,061,680 | A * | 5/2000 | Scherf et al. ........................ 1/1 |
| 6,151,020 | A | 11/2000 | Palmer et al. |
| 6,175,842 | B1 | 1/2001 | Kirk et al. |
| 6,237,025 | B1 | 5/2001 | Ludwig et al. |
| 6,259,969 | B1 | 7/2001 | Tackett et al. |
| 6,353,851 | B1 | 3/2002 | Anupam et al. |
| 6,363,301 | B1 | 3/2002 | Tackett et al. |
| 6,378,001 | B1 | 4/2002 | Aditham et al. |
| 6,418,471 | B1 | 7/2002 | Shelton et al. |
| 6,430,602 | B1 | 8/2002 | Kay et al. |
| 6,487,583 | B1 | 11/2002 | Harvey et al. |
| 6,507,726 | B1 | 1/2003 | Atkinson et al. |
| 6,651,061 | B2 | 11/2003 | Unchida |
| 6,668,273 | B1 | 12/2003 | Rust |
| 6,683,940 | B2 | 1/2004 | Contractor |
| 6,708,172 | B1 | 3/2004 | Wong et al. |
| 6,741,833 | B2 | 5/2004 | McCormick et al. |
| 6,748,420 | B1 | 6/2004 | Quatrano et al. |
| 6,758,754 | B1 | 7/2004 | Lavanchy et al. |
| 6,785,708 | B1 | 8/2004 | Busey et al. |
| 6,901,438 | B1 | 5/2005 | Davis et al. |
| 6,938,212 | B2 | 8/2005 | Nakamura |
| 6,950,852 | B1 | 9/2005 | Kobayaghi et al. |
| 6,993,555 | B2 | 1/2006 | Kay et al. |
| 7,051,068 | B1 | 5/2006 | Kawase et al. |
| 7,139,795 | B2 | 11/2006 | Davis |
| 7,139,799 | B2 | 11/2006 | Qian et al. |
| 7,167,142 | B2 | 1/2007 | Buckley et al. |
| 7,194,542 | B2 | 3/2007 | Segan et al. |
| 2001/0037365 | A1 | 11/2001 | Montague et al. |
| 2002/0002586 | A1 | 1/2002 | Rafal et al. |
| 2002/0055974 | A1 | 5/2002 | Hawkes et al. |

OTHER PUBLICATIONS

DreamChat—Streaming Avatar Photo Chat—Glossary of Chat Features, at web.archive.org/web/20010817025834/www,dreamchat.com/products/features.html (Jan. 25, 2001).

Hartwell, Using Ibook Chat, at www/ibook.com/documentation/ug/ug-chat.htm (May 5, 2002).

Lieberman et al., Let's Browse: a collaborative browsing agent, Knowledge-Based Systems, 12(8):427-431, ISSN 0950-7051 (1999).

Roseman and Greenberg, TeamRooms: network places for collaboration, in Proceedings of the 1996 ACM Conference on Computer Supported Cooperative Work (Boston, Massachusetts, Nov. 16-20, 1996), Ackerman, Ed., CSCW '96, ACM, New York, NY, pp. 325-333 (1996).

Steinfield et al., Supporting Virtual Team Collaboration: The TeamSCOPE System, Group '99, Phoenix, Arizona, USA, pp. 81-90 (1999).

Twidale et al., Browsing is a Collaborative Process, Information Processing & Management, 33(6):761-783 (1997).

Ulrich and Hauck, Promondia: a Java-based framework for real-time group communication in the Web, Computer Networks and ISDN Systems, North Holland Publishing, Amsterdam, NL, 29(8-13):917-926 (Sep. 1, 1997).

Van Dyke et al., Butterfly: a conversation-finding agent for Internet relay chat, Los Angeles, CA, Jan. 5-8. 1999, Proceedings of the $4^{th}$ International Conference on Intelligent User Interface, pp. 39-41.

Vronay et al., Symposium on User Interface Software and Technology, Proceedings of the $12^{th}$ Annual ACM Symposium on User Interface Software and Technology, Asheville, NC, Nov. 7-10, 1999, pp. 19-26.

* cited by examiner

INTERACTIVE WEB COLLABORATION SYSTEMS AND METHODS

CROSS-REFERENCE TO RELATED APPLICATION

This application is a continuation of U.S. patent application Ser. No. 12/011,332, filed Jan. 25, 2008, which is a continuation of U.S. patent application Ser. No. 10/439,143, filed May 14, 2003, now U.S. Pat. No. 7,571,212, which claims the benefit of U.S. provisional application No. 60/381,060 filed May 14, 2002, all of which are incorporated-by-reference herein in their entireties.

REFERENCE TO A COMPUTER PROGRAM LISTING APPENDIX

This application contains a computer program listing appendix submitted on two copies (i.e., copy 1 and copy 2) of a compact disc, which is hereby incorporated-by-reference herein in its entirety. The computer listing appendix is submitted as a Word file named Appendix A, which is a 570 kb in size and was created on May 14, 2003.

BACKGROUND OF THE INVENTION

This invention relates to the Internet, and more particularly, techniques for creating and viewing material on the World Wide Web ("web"), and to techniques by which multiple individuals can communicate with each other and work collaboratively on content and materials.

The World Wide Web has made the Internet accessible to a broad range of people. One can search the web and view large amounts of material using a web browser. Recent improvements have made it easier for individuals to contribute their own ideas and creative content via the web. However, there is no satisfactory framework within the web to assist and enable a group of people who may be physically remote from each other, to talk to each other, work together, discuss ideas, create, view, enhance, modify, alter, comment on, and create multiple alternative versions of new material wile recording their interact ions and contributions in such a way that participants may be automatically identified and rewarded for their efforts, the deliberations of the group preserved and reviewed, and the sequence of interactions reproduced. As a result, many people who have access to the web do not use it in their collaborative efforts.

Furthermore, there is no satisfactory framework within the web to support the definition of pre-defined roles and responsibilities for group members, by which groups organize their activities, nor any satisfactory framework within the Web either to assist participants in understanding, reviewing, accepting, or performing those roles, or to implement systems or methods by which those roles may be objectively specified and carried out automatically or semi-automatically by intelligent artificial agents.

It is therefore an object of the present invention to facilitate the collaboration of multiple participants using a data network such as the web and to record the particulars of their collaboration.

It is also an object of the present invention to provide a way in which to facilitate a description, specification, and implementation of roles using a data network such as the web.

SUMMARY OF THE INVENTION

These and other objects of the invention are accomplished in accordance with the principles of the present invention by providing a framework and a space referred to as a topic room in which one or more individuals or other entities may collaborate on topics of mutual interest. A topic room is a collaborative framework, in which multiple individuals may carry out live or non-real time written, verbal, or multimedia conversations, and may work together to discuss, create, browse, modify, comment on, disagree about, create enhancements to or alternative versions of, and otherwise contribute to content or material. Within the framework of the topic room, such discussions are recorded and logged, as are all elements of the collaboration, interactions between participants, and individual contributions of those participants.

A topic room includes a chat room. A chat room holds all of the currently active participants in the topic room, and supports their interactions. The chat room records the activity in the topic room, makes that activity visible to the participants, monitors topic room activity, and carries out various support tasks as requested by the chat room participants.

Activity in a topic room is a sequence of actions. A record of topic room activity comprises a log of topic room actions, created by the chat room. This log becomes part of the contents of the topic room, and may be selectively inspected, reproduced, and animated. A recorded topic room action can be animated. Animating a recorded action reproduces the action, and animating a sequence of actions has the effect of recreating the activity in the topic room.

A conversation between participants in a topic room may well include verbal communication. A conventional telephony system may be employed for this conversation. Alternatively, individuals or groups may employ local recording techniques that generate digital audio or other multimedia recordings, and then share those recordings, or portions thereof. The audiorecorder is a topic room tool which supports local or remote capture of audio or multimedia recordings of participants' conversation, singing, recitations, musical or other performances, etc., and assists in the inclusion of such material into the topic room along with useful other information. The other information can include a timestamp, a source identifier (e.g., the speaker), and a topic specification. The audiorecorder can be used to annotate a continuous recording, or include limited "clips" taken from a larger recording in the topic room record.

Digital recordings are only one example of material relevant to topic room activity that may not have a native form that allows them to be easily and directly incorporated into a page. Such material is called "external material". Topic rooms include a method for representing external material outside of a folder by a page inside the folder, and for generating an internal Universal Reference Locator from the external URL of the external material.

A tag makes it possible to locate external material. A tag is a structured meta-content object that contains information about folder content. A tag can be embodied as an HTML element. A tag is created for, and stored in, every page. A tag holds all the meta information (non-content information) for a page. A tag holds system-generated information, such as authoring information and various content links. A tag may also contain a behavior object, through which the behavior of the page is defined, using techniques that are discussed below. Finally, the tag of each page may hold a template copy of the link to that page.

Collaborative efforts are aided by techniques which support the tentative and contingent association of comments, notes, alternative renderings, pictures, and other material with the content of pages. Topic rooms support this contingent association with "links". Links are structured meta-content objects that refer to a page, and can be inserted into one or more pages. A link can be embodied as an HTML element. The visual aspect of a link can be determined on a case-by-case basis when the page in which it is embedded is displayed. As a result, a particular link can be rendered visible or invisible, sets of related links displayed in such a way as to share identifying properties such as color, etc. The link could also be rendered by rendering the contents of the page to which the link refers. The rendering characteristics of a link can be determined by the link's creator, the owner of the page in which the link is embedded, the viewer of the page, or other controlling factors. Links can be copied manually or automatically using a "drag-and-drop" or other operation.

Each participant in the activities that take place in a topic room may be represented by an identity. An identity may be a topic room whose topic is the entity it represents. Whenever an entity participates in any topic room, that entity's activity may also be recorded in their identity.

All activities in a topic room may be captured and described using a formalism for creating, sustaining, and supporting communication between independent, distributed, self-regulating, cooperating objects. An object can do two things: it can communicate with other objects, and it can control non-objects.

Folders and pages are objects. Other objects include the audiorecorder, the controller, the chat room, and the server. Objects may communicate with each other by constructing, transmitting, receiving, and interpreting messages. Each message constitutes a plurality of statements. A statement may be a speakable command that can be interpreted by an interpreter and complies with the specifications of a grammar. A statement may define an atomic event or action within a topic room.

A script comprises a parallel sequence of statements. Scripts are used to define useful collections of actions, often described as "behavior". All objects have such scripts associated with them. Hence, objects have "behavior" associated with them. One object can inherit the scripts associated with another object, and thereby "inherit" part or all of the "behavior" associated with that other object.

As described above, every page may have a tag associated with it. In the tag is the behavior for the page. A behavior is the collection of scripts that are attached to the page, and which contribute to the behavior of the page. The behavior of a page is the behavior specified by the page's tag. This in turn is the behavior of the scripts in that tag, including any inherited behavior.

The behavior of a folder is the composition of the behavior of the pages in the folder. Composition is a well-defined inheritance process.

A persona is a folder whose behavior has been designed to be useful, interesting, entertaining, or otherwise distinguishing behavior. A participant in a topic room may temporarily or permanently "adopt a persona" by having that participant's identity folder inherit the scripts in the persona folder.

An assistant is a self-contained identity that has sufficiently well-defined, sophisticated, useful, and or interesting behavior, history, and content that it can usefully contribute by itself as a topic room participant.

Activity within a topic room, may constitute parallel sequences of messages exchanged between the objects representing the participants in the room and the material upon which they are collaborating. Records of topic room activity may take the form of scripts, and may constitute the history of their respective topic rooms.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
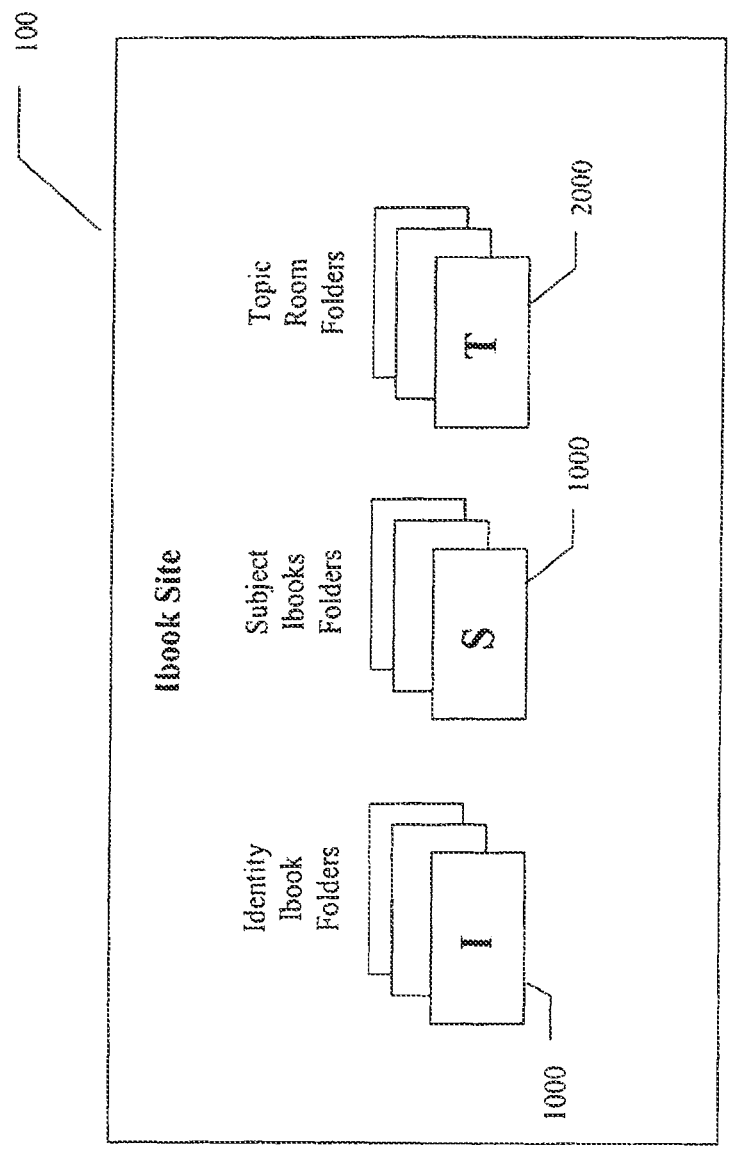
FIG. 1 shows an illustrative Ibook site in accordance with the present invention.

Generally speaking, the present invention provides improvements on existing interactive web book systems. An existing interactive web book system is described in commonly-assigned U.S. Pat. No. 6,052,717 to Reynolds et al. (hereinafter "Ibook system" (Ibook is a registered trademark of Family Systems, Ltd.)), which is hereby incorporated by reference herein in its entirety. An interactive web book system is a self-extending, self-sustaining information redistributing web robot which is resident on a data network such as the Internet or an intranet. Material in an interactive web book system may be organized in the form of web pages. Material may be text, two-dimensional, three-dimensional or n-dimensional graphics, animation, audio, video, source or executable code, or any type of multimedia format. Within each Web page, material may be organized in passages. Passages can be of any suitable size, such as a paragraph for textual material, or a video or audio clip of a certain length for multimedia material. Related interactive web book system technology supports the automatic distribution, publishing, and synchronization of interactive web book system content and other data between multiple users and sites. These features are described in, for example, Reynolds et al. PCT Publication No. WO 02/088909, filed Feb. 1, 2002 (hereinafter "MySharer software" (MySharer is a registered trademark of Family Systems, Ltd.)), which is hereby incorporated by reference herein in its entirety.

Topic Rooms

A topic room may introduce all of the behavior and functionality of existing interactive web book systems, such as the book system. A topic room also preferably includes a chat room that supports and records interactions between multiple users and Verbol scripts (Verbol is a registered trademark of Family Systems, Ltd.) that define the behavior and capabilities of the topic room. The term Ibook folder will be used herein to refer to material that is stored in an interactive web book system. Therefore, a topic room preferably includes an Ibook folder, a chat room, and Verbol scripts.

Every topic room preferably has a topic. The topic is what the material in the Ibook folder is about. A subject Ibook folder is an book folder whose topic is a particular subject (other than being about an Ibook member or a persona). An identity Ibook folder is an Ibook folder whose topic is an individual (or other entity) that is an enrolled member of an Ibook site. A persona is an Ibook folder whose topic is a history and a named set of behaviors, both of which a contributor can adopt to enhance their identity.

Ibook Sites

Topic Rooms are held in Ibook sites. Ibook sites allow users to gain access to topic rooms by enrolling as members in the Ibook site that holds the topic room. Every topic room is preferably contained within a single Ibook site. An Ibook site may contain multiple topic rooms. An exemplary Ibook site is described more detail in the Ibook system patent.

Ibook Folders

As used herein, the terms "Ibook folder" and "topic room" are largely interchangeable. Where a distinction appears to be indicated, an Ibook folder should be considered to correspond to the aspect of a topic room that has the properties of existing interactive web book systems such as the Ibook system. An Ibook folder has the capacity to store and present content, maintain attribution and derivation information associated with the content, and so forth.

Formally, in object-oriented programming terminology, a topic room is an Ibook folder: it has all of the properties, methods, and behaviors or an Ibook folder, and may well have additional properties methods and behaviors.

The Ibook folder aspect of a topic room stores all of the permanent content of the topic room. That is, the persistent storage of all topic room state information is in the Ibook folder of the topic room. The content, history, and behavior of a topic room may be organized into a collection of Ibook pages.

An Ibook page comprises an itag and content material. Every Ibook page preferably has an itag. The content portion of the Ibook page may be empty. An itag holds information about the page, and a vspace. The vspace holds Verbol scripts that define behavior associated with the page.

Each Ibook folder preferably has several distinguished pages. One distinguished page may be the "home page" of the Ibook folder. The topic of the Ibook folder may be specified in the itag of the Ibook folder's home page, other distinguished pages may be "chat pages". A chat page holds a record or log of a Verbol chat that took place in the Ibook chat room. Alternatively, a chat page may be located elsewhere within a tonic room such as within a Verbol chat room.

Itags

An itag is a structured text element. Every Ibook page preferably has an itag in one embodiment, an itag may be an HTML element. Every itag preferably contains system-generated identifying information about the Ibook page, an archetypal istamp for the Ibook page, and the vspace of the Ibook page.

The system-generated information in an itag may include but is not limited to a) template links, also known as attribution links; b) copy links, also known as derivation links; c) identity links, which point to the contents of the Ibook page; d) child links, which should be generated in the child list of the vspace of the parent; and e) authoring information, including but not limited to the universal date and time of creation of the content associated with the itag, author or speaker (that is, the creator of the content itself), date of contribution to the Ibook; identity of the Ibook contributor, and additional information such as type, category, notes, descriptions, etc.

Vspaces and Verbol Scripts

The itag in an Ibook page preferably holds a vspace. A vspace contains a user-defined Verbol script that defines the behavior of the Ibook page. Among other things, a page's Verbol script may act to automatically incorporate contributions to the Ibook page or folder. As a result of the incorporation, some Ibook pages may be revised and new Ibook pages may be created.

When an Ibook page is created, it normally inherits its behavior, in the form of Verbol statements, from its parent and from its template. The parent of an Ibook page is the Ibook page that the Ibook controller of the page's creator was browsing when the page was created. As part of the creation process, the creator can optionally designate any page in the current Ibook folder as the template for the page being created.

The method by which an Ibook page inherits Verbol behavior may be either static or dynamic. In the static method, when a page is created the contents of the vspace of its parent and its template is copied into the new Ibook page's vspace. In the dynamic method, when a page is created the contents of the vspace of its parent and its template is referenced in its vspace. Thus, in the static method, subsequent changes to a page's parent or template behavior does not result in changes in the page's behavior. In the dynamic method, subsequent changes to the parent or template behavior is reflected in the page's own behavior. When the static inheritance method is employed, the inheritance may be "refreshed" from time to time. In the refresh operation, new copies of the parents and template's behavior are transferred to the page, so that the page acquires any changes in the parent's or template's behavior that took place since the last static copy operation.

Ibook Page Content

The content associated with an Ibook page may reside in the Ibook page itself, or external to the page. In one embodiment of Ibook pages, content within the page is in the form of HTML statements. Other forms of content include but are not limited to Microsoft Word documents, PDF documents, faxes, spreadsheets, audio and other multimedia recordings, etc.

External Content

A topic room uses Ibook pages and istamps to incorporate content into an Ibook folder. An Ibook folder may include any kind of content that can be digitally located and accessed, so that the fundamental advantages of being part of an Ibook folder (the ability to access and manipulate the content, the maintenance of a history for the content including at least derivation and attribution information, and the storage and invocation of behavior of the content) can apply to content of any kind.

Content is incorporated into an Ibook folder by creating an Ibook page to hold the content, or to refer to the content. All the content associated with an Ibook folder is preferably held in Ibook pages, or referred to by Ibook pages. For example, in one embodiment of istamps, the Ibook controller uses Uniform Resource Locators (URLs) to refer to, locate, and access all forms of content. In the embodiment under discussion, the Ibook controller also uses a URL to refer to, locate, and access Ibook pages. In this embodiment, the Ibook controller handles "external content"—content that can not be inserted into an Ibook page, but that is to be logically included as part of the Ibook page—by making use of an algorithm that accepts as input an arbitrary content URL, and produces as output a "mapped" URL that is within the domain of the Ibook folder. The Ibook controller creates an Ibook page with this mapped URL. The itag of the new page includes the URL of the external content. If some content is stored inside of its istamp, it is stored in such a way that it can be easily located once the istamp has been located. Thus either the Ibook page or the external content may be located by knowing the URL of the other element.

Verbol Chat Rooms

A. Overview

Figure 2:
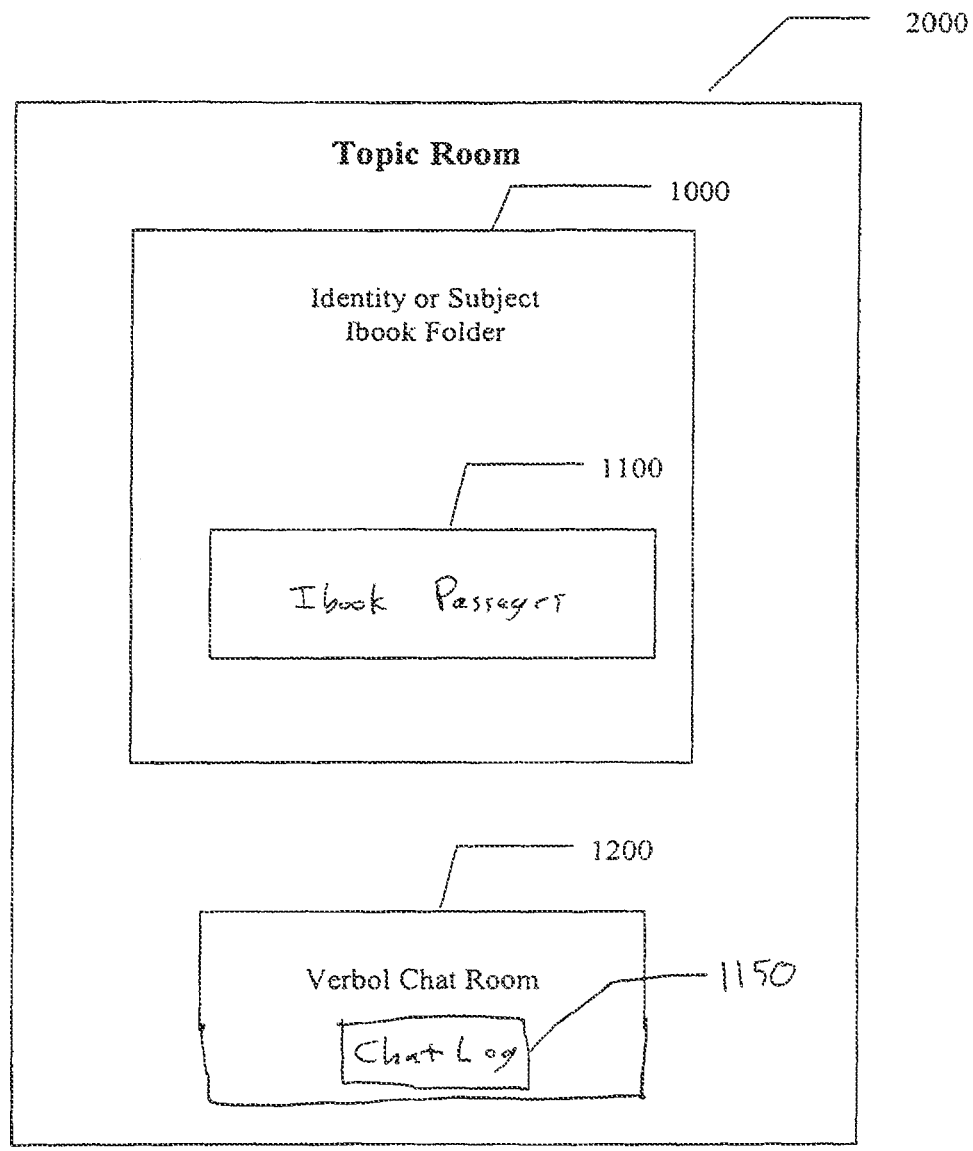
FIG. 2 shows an illustrative topic room in accordance with the present invention.

As discussed above, and as illustrated in FIG. 1, Ibook site 100 may include multiple Ibook folders 1000. Some of the folders may be identity Ibook folders, and some may be subject Ibook folders. In addition, Ibook site 100 may include one or more topic rooms 2000. FIG. 2 shows a more detailed diagram of topic room 2000. As discussed above, and as illustrated in FIG. 2, topic room 2000 comprises an Ibook folder 1000 and a Verbol chat room 1200. The Ibook folders in topic rooms may typically be subject Ibook folders, but may also be identity Ibook folders. Ibook folders may include multiple Ibook passages such as Ibook passages 1100. Topic room 2000 preferably includes a chat page or chat log 1150.

Verbol chat room 1200 allows Ibook site members to exchange messages and contributing content to the Ibook folder 1000 within topic room 2000. An interaction of this sort is referred to as "Verbol chat," or simply as a "chat". Verbol chat room 1200 (or simply the chat room) supports Verbol chats, and generates a complete history of each chat, storing the history in the chat page or chat log 1150 of topic room 2000. The history becomes an integral part of the content of topic room 2000.

A topic room may include one or more Ibook folders and one or more chat rooms. In one possible embodiment, one chat room is created for each Ibook folder nominated as a Topic Room. When a Topic Room is created (for instance, during enrollment of an Ibook site user, or when an Ibook site user issues a "create new Ibook folder" command to the Ibook site) a chat room is created by the Ibook site that is supporting the Ibook system, and is associated with the Topic Room. Each Verbol chat room preferably has a name. Its name may be derived from the name of the Topic Room with which it is associated.

A Verbol chat room may a) allow topic room participants to engage in live, on-line communication with each other via chat messages; b) record their interactions as a log of chat messages in the chat page; and c) is capable of animating those records—paying them back—so as to reproduce recorded chat room interactions. The chat room also reduplicates the contributions of participants to other Ibook folders by sending Verbol messages to other relevant Ibook folders. Whenever a participant makes a contribution to a topic room, an entry is added to the log, or history, of that topic room describing the contribution, and a Verbol message is also sent to the participant's identity, which results in an entry in the history of that Ibook folder.

B. Server Side Chat Room Components

An Ibook site sponsor maintains a chat server computer on a network in order to support topic rooms. The chat server computer runs a chat server process. The chat server computer may be the same physical computer as the Ibook site computer, or they may be different computers attached via a network. In addition to the chat server process, one chat room software component for each active chat room runs on the chat server computer supporting that chat room.

C. Client Side Software

When a user enrolls in a topic room, an enrollment program directs the user to download and install any necessary topic room software onto their client computer. In another suitable approach, the software may be downloaded and installed at any later time onto a client computer. The topic room software includes a standard web browser, an Ibook controller which creates a Verbol wrapper around the web browser, a Verbol chat client (or simply chat client) software, and any other suitable client software for supporting interaction with the topic room.

D. General Operation

Figure 3:
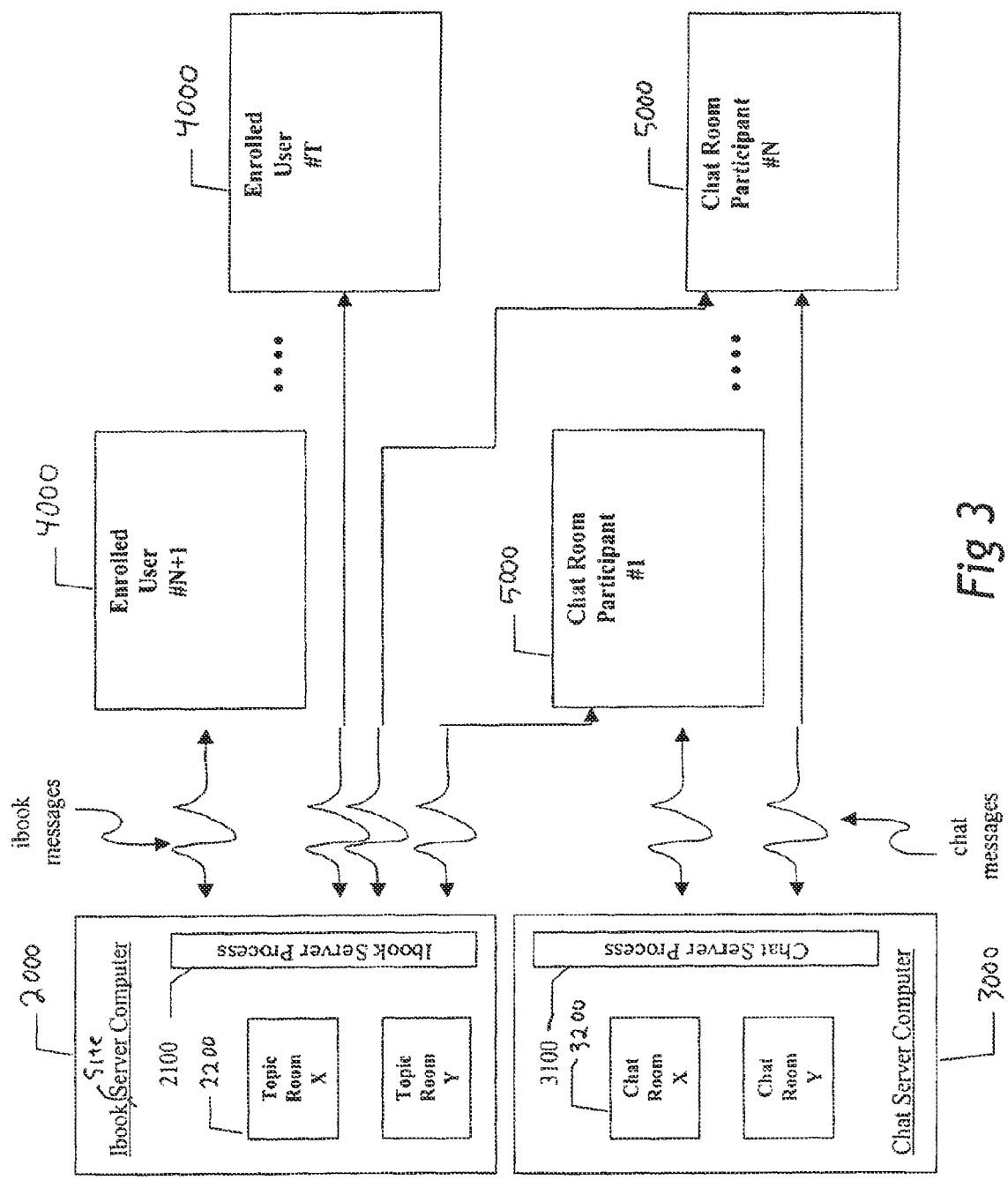
FIG. 3 shows a system diagram of an Ibook site server, a chat server, and client computers in accordance with the present invention.

During operation, Verbol chat participants of a topic room using client computers interact with each other by exchanging text, media, and Verbol messages, and create, display, and modify Ibook pages. As shown in FIG. 3, these interactions are supported by Ibook site server computer 2000 and chat server computer 3000. In particular, chat server process 3100 receives chat messages from individual client computers 4000 and 5000 and rebroadcasts those messages to all participants in the chat room of a topic room. Chat server process 3100 also sends all chat messages to the chat room software component running on chat server computer 3000. This chat room software component is responsible for logging all chat messages in the chat page of the associated topic room, and for retrieving those messages on demand for playback to chat room participant. The chat room software component use standard Ibook folder software and operations to maintain and access the chat page in which this log, or history, of chat messages is maintained.

Ibook site server 2000 and chat server 3000 may simultaneously support multiple chat room participants and multiple enrolled non-chat Room Ibook site users.

Ibook site server 2000, chat server 3000, and client computers 4000 and 5000 may be personal computers, laptop computers, mainframe computers, personal digital assistants (PDAs), etc. or any combination of the same. Ibook site server 2000 and chat server 3000 may communicate with client computers 4000 and 5000 over any communications links suitable for communicating data such as network links, dial-up links, wireless links, hard-wired links, etc.

E. IRC Embodiment

In one possible embodiment, the Internet Relay Chat (IRC protocol is used support chat rooms. In such an embodiment, the chat server is built on top of a standard IRC server, and chat messages are text messages wrapped inside the IRC message protocol. In this embodiment, the Verbol chat client communicates with the chat server over a network or Internet using the IRC protocol.

F. Chat Room Activation

An enrolled Ibook site member needs to log into a topic room before he or she can participate in a Verbol chat. In addition to logging in, the member also needs to "enter" the chat room of the topic room. Once they have entered the chat room, they become a participant in the Verbol chat. Users may enter a chat room by running their Verbol chat client software on their client computer, and providing certain information to the chat client, such as the name of the chat room they want to enter, and the URL of the chat server that is supporting that chat room. Alternatively, this process may be automated so that a user may simply select a chat room icon in the topic room to enter the chat room.

When an enrolled user enters a chat room, the chat server determines whether or not the chat room is active. If the chat room is not active, the chat server accesses the topic room database, activates the chat room, initializes the chat room software component running on the chat server computer, and enters the user as a participant in the chat room. The chat room will remain active as long as it has any participants. When it no longer has any participants, the chat server preferably deactivates the chat room.

Figure 7:
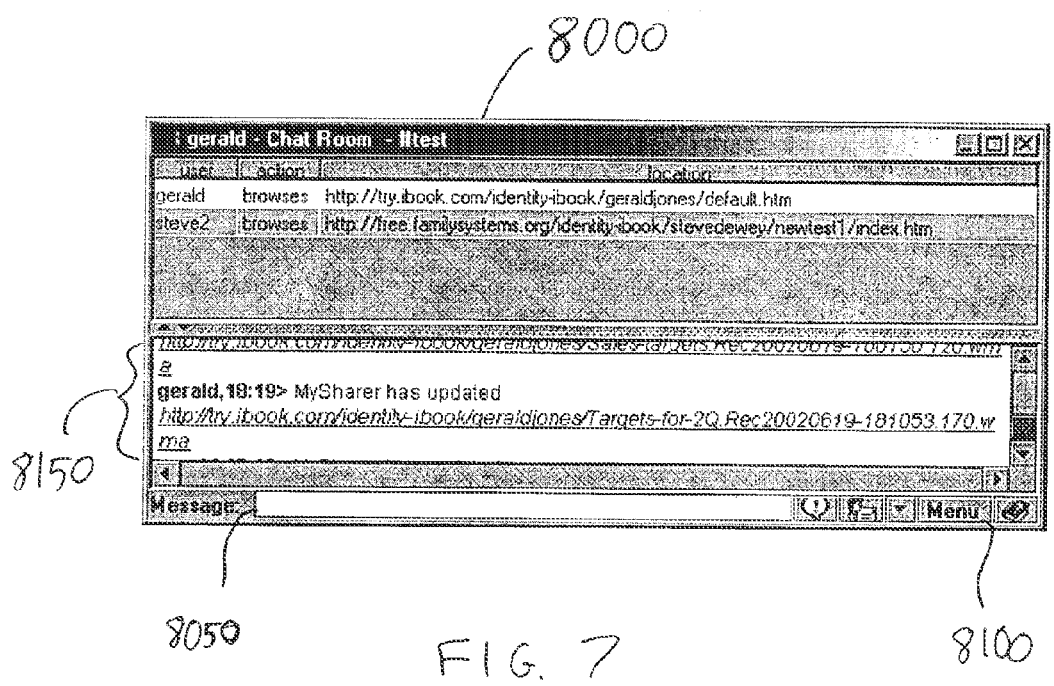
FIG. 7 shows an illustrative chat room window in accordance with the present invention.

FIG. 7 shows an illustrative chat room window 8000. As illustrated in the top portion of window 8000, there are two participants in the chat room: gerald and steve2. The top portion of window 8000 also shows their most recent action, which is "browses" for both participants and the locations of their web browser.

G. Chat Room Participation

Chat room participants can send and receive messages to and from other participants, and make various requests of the chat room and of other participants. For instance, they can ask the chat room to let them "follow" another participant as the participant browses from place to place. Participants make such requests using the Verbol chat client. The chat client may perform at least the following functions:

1. Display relevant information, including the names, actions, and locations of participants, and certain selected chat messages.
2. Provide a user interface for issuing chat room requests.
3. Filter chat messages, selecting certain messages for display.
4. Hide chat messages, so that they are not displayed.
5. Monitor chat messages, and execute predefined processes when certain messages, or combinations of messages, are detected.

The requests that a chat client supports include the following:

1. Enter a designated chat room.
2. Leave the current chat room.
3. Follow another participant in the chat. A participant may follow another participant for example by right clicking on the other participant in window 8000 and selecting this option.
4. Browse to the same location as another participant in the chat. A participant may browse to the same location as another participant by selecting that participant's location in the top portion of window 8000.
5. Send a user message to the chat room. A participant may send a message to the chat room by entering the message in message text box 8050 in window 8000.
6. Show older messages in the chat room. A participant may view older messages by selecting menu option 8100 in window 8000 and selecting this option.

The chat client supports these requests by gathering necessary information from the participant and then creating and transmitting chat messages. The chat client also receives all chat messages broadcast by the chat server, examines each messages, and processes it appropriately. Depending upon certain predefined participant preferences, the chat client may display some of the messages it receives. Chat messages are displayed for example in area 8150 of window 8000. The chat client also passes all chat messages to other client topic room software components. When a topic room user is participating in a chat room, all of the topic room participants' client software components monitor all chat messages.

H. Chat Messages

Topic room software generates two types of chat messages: user chat messages and Verbol chat messages. User chat messages are generated by the chat client whenever the user types, or otherwise creates, a message to chat room participants. User chat messages may have arbitrary message content that is examined but often not interpreted by topic room software components. Verbol chat messages are chat messages that are generated by topic room client or server software components. Verbol chat messages contain Verbol commands that are typically interpreted by and acted upon by other topic room software components. Thus, in general, both human participants and software clients create, monitor, examine, and react to chat messages.

Figure 5:
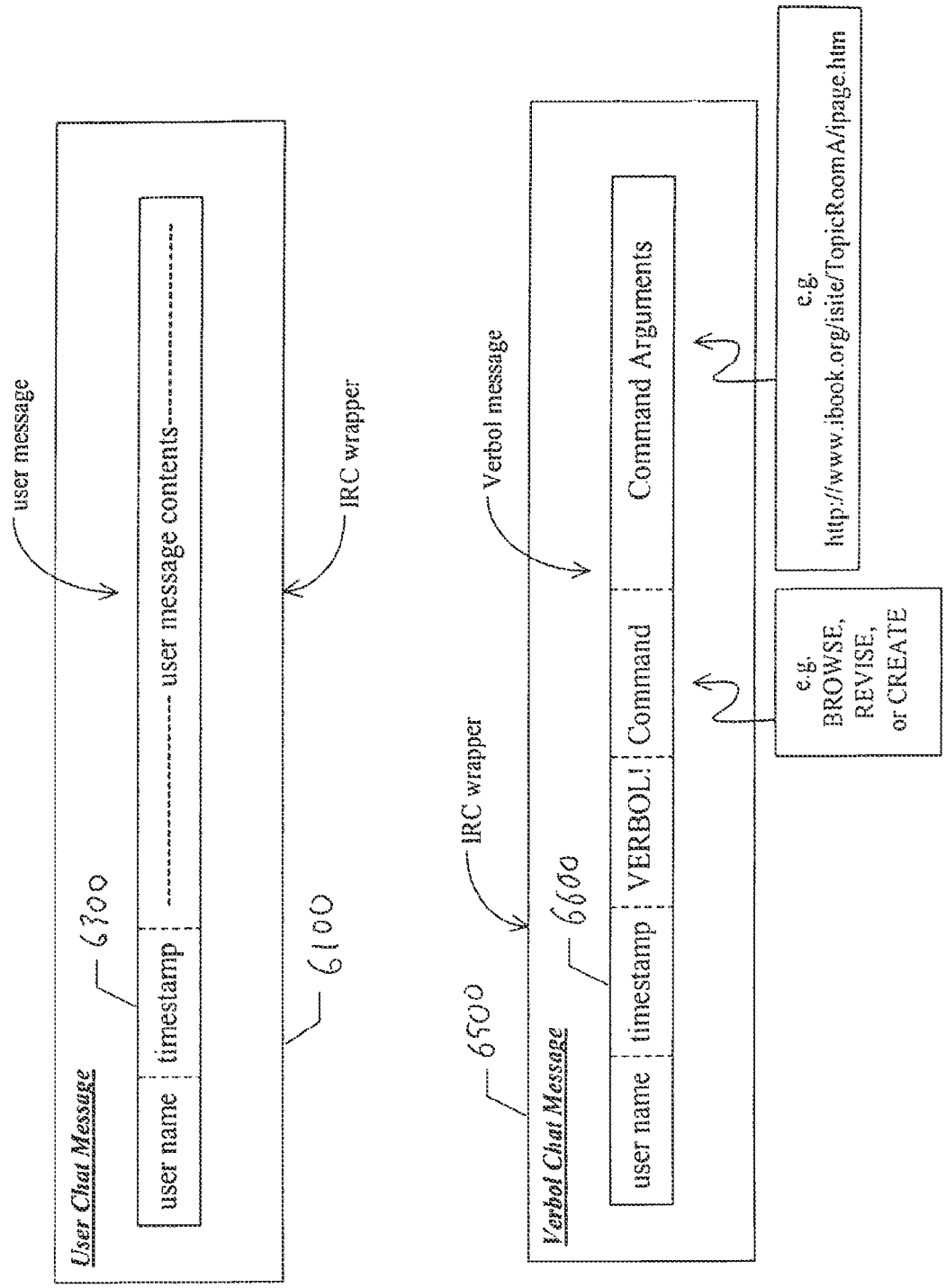
FIG. 5 shows a user chat message and Verbol chat message in accordance with the present invention.

FIG. 5 illustrates content 6300 and 6600 of user chat message 6100 and Verbol chat message 6500, respectively. Content 6300 of user chat message 6100 comprises the following fields: a) a user name indicating the name of the participant who generated the message; b) a timestamp indicating when the message was generated, and c) an arbitrary message content that the user entered. Content 6600 of Verbol chat message 6500 also comprise the user name field and the time stamp field. In addition, Verbol chat message 6500 also comprises a designated prefix field (the string "VERBOL!" in one possible embodiment), a recognized Verbol command field (such as "BROWSE", "REVISE", or "CREATE") and a set of command arguments (such as a URL). In one possible embodiment cat messages are "wrapped" in an IRC protocol for transmission between software components on a client computer, for transmission from a client computer to the chat server, and for transmission from the chat server to all participant client computers.

Topic Room Client Components

Figure 4:
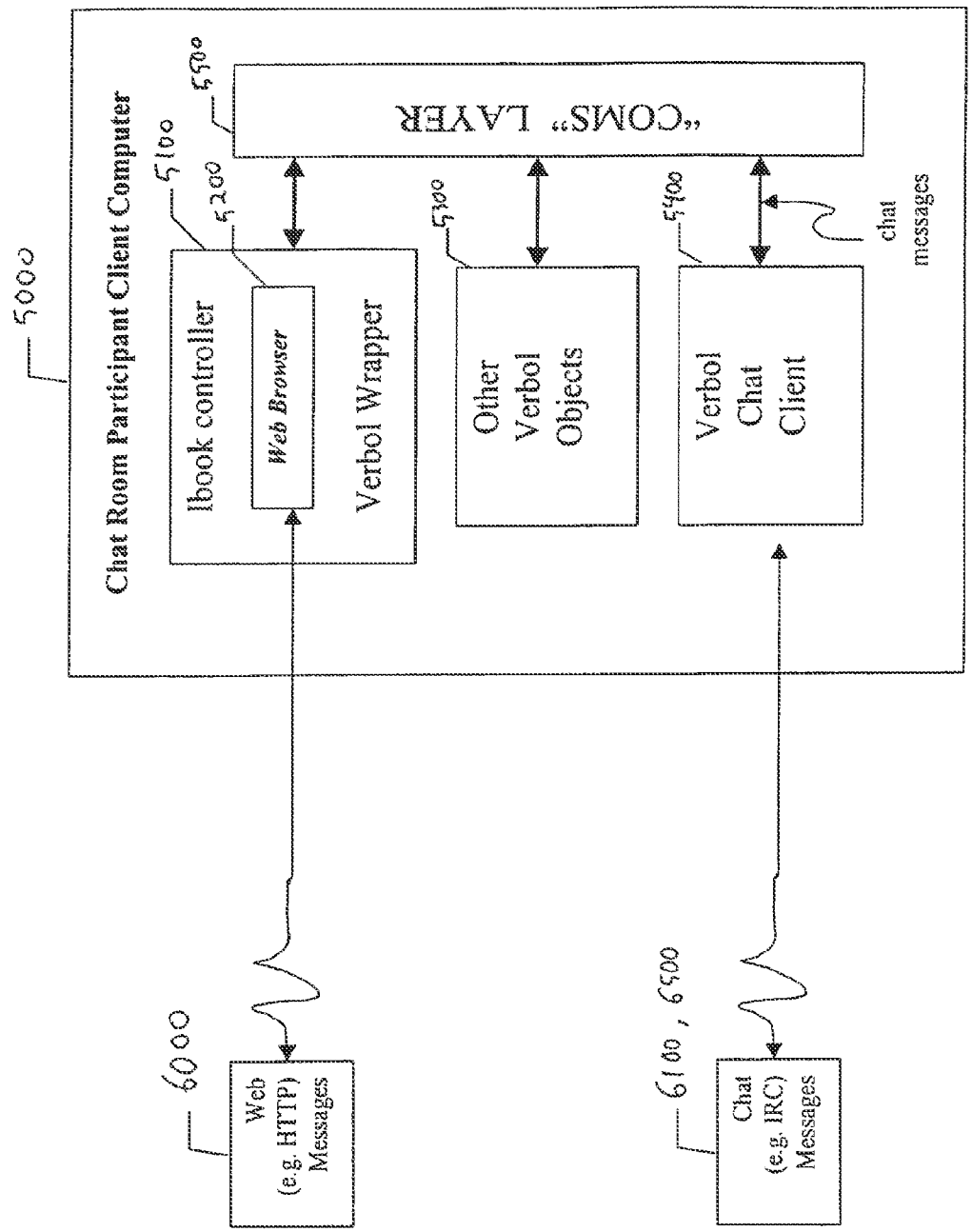
FIG. 4 shows topic room client components in accordance with the present invention.

A topic room client computer runs software designed to support Ibook folder contribution and chat room participation. This software may be downloaded (e.g., from an Ibook site) during topic room user enrollment, or at a convenient later time. As shown in FIG. 4, a client computer 5000 runs a web browser 5200 to support Ibook folder contribution, and a Verbol chat 685 client 5400 to support chat room participation. The client computer may also be running additional Ibook client components. All of these components comminute with each other by exchanging Verbol chat messages through a communications component referred to as "Coms Layer" 5500. Chat client 5400 receives all chat messages from the chat room (e.g., chat room 3200 (FIG. 3)), interprets each message and also passes it on to the other client components by sending the message to the Coms Layer 5500.

The web browser used to access the Ibook folder is customized by wrapping it in an Ibook controller component 5100 that supports specialized Ibook folder operations. This controller also acts as a Verbol wrapper, translating the web browsers actions into Verbol chat messages, and allowing other components to interact with the web browser by sending it Verbol chat messages. The web browser continues to communicate with the Ibook web server using, for example, standard web messages, such as HTTP messages. In addition, whenever a topic room user is participating in a Verbol chat room, every action the Ibook controller takes, such as creating a new Ibook page, browsing to a different Ibook page, or revising an Ibook page, is expressed as a Verbol command that is transmitted as a Verbol chat message to the chat room. As a result, the log of the chat room contains a complete history of the action of all participants in the chat room. In addition, any participant "A" can browse to the current location in the topic room that any other participant "B" is at. Furthermore, any participant "A" can "follow" any other participant "B" from location to location in the Ibook folder. The "follow" operation would be performed as follows:

1. Participant A selects participant B from the list of current chat room participants displayed by participant A's chat client;
2. Participant A indicates that participant B should be "followed" by selecting a "Follow" control (such as a menu option) displayed by participant A's chat client;
3. Participant A's chat client issues a Verbol chat message specifying the follow action, and the name of the participant to be followed, and transmits that message to the chat server and to the Coms layer of the client computer.
4. Participant A's Ibook controller has registered with the Coins layer, and thus receives the follow Verbol chat message. It registers the fact that from now on it is to monitor all chat messages for "DROWSE" Verbol chat messages from participant B, and when it finds such a message it is to instruct the web browser that it is wrapping to browse to the URL specified in participant B's chat message.

5. Participant A's "follow" chat message is also sent to the chat server. The chat server sends it to the chat room software component running on the chat server computer, and to all of the chat room participants.

6. The chat room server component receives the chat message and writes it to the chat page of the Topic Room.

If at some later time Participant A wants to stop following Participant B, the following steps are taken:

1. Participant A selects a "stop following participant B" control on his chat client.

2. Participant A's chat client issues a Verbol chat message specifying the "stop following" action, and transmits that message to the chat server and to the Coms layer of the client computer.

3. Participant A's Ibook controller receives the stop following Verbol chat message. It registers the fact that from now on it is to ignore any chat messages for "BROWSE" Verbol chat messages from participant B, and does so.

4. Participant A's stop following chat message is also sent to the chat server. The chat server sends it to the chat room software component running on the chat server computer, and to all of the chat room participants.

5. The chat room server component receives the chat message and writes it to the chat page of the topic room.

History Activation

Playing back the history of participation in a chat room is another important capability. Because Ibook folder content is not removed or modified, only revised (that is, a new copy made with the desired modifications), any previous Ibook folder state can always be redisplayed. For instance, a participant can ask for the last 10 minutes of chat room activity to be re-enacted, as follows:

1. Participant A selects "replay recent history" from a control on his or her chat client.

2. The chat client asks participant A how many minutes back the playback should begin. Participant A enters a response (for example "10 minutes")

3. Participant A's chat client issues a Verbol chat message specifying the replay history action, and the time value of 10 minutes, and transmits that message to the Coms layer of the client computer and to the chat client.

4. Participant A's Ibook controller has registered with the Coms layer, and thus receives the replay history Verbol chat message. It registers the fact that from now on it is to monitor all chat messages for "BROWSE" Verbol chat messages with its own name, and when it finds such a message it is to instruct the web browser that it is wrapping to browse to the URL specified in those chat messages.

5. Participant A's replay history chat message is also sent to the chat server. The chat server sends it to the chat room software component running on the chat server computer, and to all of the chat room participants.

6. The chat room server component receives the replay history chat message and interprets the message. It acts on the message by retrieving all of the messages it has received during the last ten minutes and resending them to the chat server in chronological order.

7. The chat server broadcasts all of the recorded messages.

8. The recorded messages are received by participant A. As participant A's chat client receives each recorded message, it displays the message. As participant A's Ibook controller component receives the messages, it filters them and directs the web browser it controls to browse to the location that participant A had browsed to during the designated times.

Verbol "Whenever" Statements

Chat client software components monitor chat messages by acting as chat listeners. A chat listener is an object that monitors chat messages, and detects certain designated messages or combinations of messages arriving in a chat room. A client component becomes a chat listener by registering with the Coms layer. In one possible embodiment, it does this by calling the Coms layer with the address of a callback function to be invoked whenever the Coms layer receives a chat message.

Each client component may handle every chat message, but a particular component may respond to many chat messages by ignoring them. However, when certain designated chat messages, or combination of chat messages, are detected, the chat listener may automatically trigger certain scripted processes. In one possible embodiment, each triggering chat message or chat message combination, and the scripted process to execute in response, is specified using a Verbol "whenever" statement stored in the vspace attached to or associated with the current Ibook page. The Verbol whenever statement has the following form: whenever <event pattern> <action pattern>. The event pattern may be any regular expression defining one or more users and their actions as logged in Verbol statements in the chat room, and action pattern may be any action or process expressed in a scripting or other language such as Verbol, Java, JavaScript, Perl, PHP, etc. For example, the following is a Verbol whenever statement: "whenever {any page/this page is} revise[d] email [it to] email-address-list," where the text in square brackets is optional, and does not change the meaning of the message. The text in braces are alternate forms meaning, respectively, any web page or the current web page, and "email-address-list" is a valid Internet electronic mail address list.

Ibook Contributors and Chat Room Participants

Topic rooms are used by members of Ibook sites. Ibook site members can contribute to Ibook folders on the site, and participate in the site's chat rooms. In order to contribute or participate, each user may be required to enroll as an Ibook site member (a one-time operation) and then log into each topic room to which they want to contribute. The member's contribution may take the form of participation in the chat room, or contribution of material to the Ibook folder, or both. Making a contribution to the Ibook folder includes participation in the chat room, because the topic room records a complete history of all contributions as entries in the chat room record.

The terms "contributor" and "participant" are largely interchangeable. The term "contributor" focuses on people who contribute content to the Ibook folder. The term "participant" focuses on people who participate in the chat room. A person can be a participant without being a contributor (if you only exchange messages with other participants, but never make a contribution to the Ibook), but if you are a contributor you are also a participant, because every book contribution results in an entry in the chat room history.

The topic room may be considered a participant in its own chat room. When it updates the chat history files in its Ibook folder, it creates a message in the chat history reflecting that contribution. Therefore it is listed as a participant, and can be found in the list of chat room participants.

Thus, some participants are human, other participants may be legal entities, and still others are objects such as topic rooms Identity Ibooks Folders Every enrolled member of an Ibook site has an identity Ibook folder on that site. An identity may be a part of a topic room whose topic is an Ibook site member. The site member may be a human individual or it may be a legal entity such as an organization or corporation.

Other identity Ibook folders describe purely Verbol constructs—collections of content, behavior, and capabilities. This sort of identity Ibook is called a Verbal assistant Verbol assistants can contribute to Ibook systems, and participate in chat rooms. For example, a meeting coordinator assistant is a set of Verbol scripts, stored in an identity Ibook folder, that knows how to coordinate meetings of remote participants. It includes scripts for calling individuals, connecting them to the conference call, etc. A glossarizer is another example of a Verbal assistant that makes contributions to an Ibook folder by monitoring the contents of the Ibook folder, finding important words and phrases, linking them to glossary pages in the Ibook folder, and helping (human) contributors add new glossary pages to the Ibook folder.

The history of an identity Ibook folder may include a complete record of all contributions that its entity has made to Ibook folders on the site.

Persona

A persona is an Ibook folder that defines and names a collection of behaviors and capabilities that have been designed to be adopted—that is, inherited by—an identity Ibook folder. Ibook site members may temporarily take on a persona by having their identity Ibook folders temporarily inherit the Verbol scripts of a persona Ibook folder. Some personae are intended to be adopted by human entities and others are intended to be adopted by Verbol assistants.

Roles

A role is a specification of what is to be achieved by the behavior of a persona. Some roles are intended to be adopted by human contributors and others are intended to be adopted by Verbol assistants.

Istamps

An istamp is a named, addressable, structured text object that points to some content. In one embodiment, an istamp is an HTML element. An istamp is designed to be used in Ibook folder content to "point to" other Ibook folder content, such as an Ibook page. An istamp's name and address is intended so make it easy to link to istamps from within other Ibook locations. Every itag includes an istamp for the Ibook page containing the itag. An istamp is designed to be inserted into Ibook content. Tools that manipulate istamps generally support a "drag and drop" operation. Therefore users can drag a page's istamp to a new location, and copy that istamp by "dropping" it into that location.

An istamp contains a reference to some content. In one embodiment, this reference takes the form of an HTML anchor element. The value of the "href" property of the element points to the content that the istamp designates.

Display of Itags and Istamps

Itags and istamps can be displayed when their associated Ibook page is displayed, or they can be hidden. Any contributor who creates an itag or an istamp can indicate whether that element is to be displayed or to be hidden. The viewer of an Ibook page can also indicate whether they want to have itags and istamps displayed, hidden, or handled according to the specification of the element's creator. The preference of the viewer may take precedence over the preference of the element's creator.

Verbol Chat Generally

In one embodiment, the chat room of a topic room is implemented using Verbol chat. In this embodiment, chat room participants chat by exchanging Verbol messages. Verbol chat supports collaborative conversations by the participants in the topic room. In one embodiment of Verbol chat, participants use the IRC protocol to exchange messages. Text messages can be typed by each participant, including Verbol assistant objects. The messages appear in a chronological, scrollable log in a "Verbol chat" window on the screen of all of the participants. Each entry in the chat log corresponds to a message from one of the participants, or one of the Verbol assistants. Each message is tagged so as to identify its origin. It is also time stamped.

A Verbol chat room allows every object to receive messages from other objects in the chat room. Although users chat to each other in unrestricted text, or send pictures, or send messages with similarly unrestricted contents, the process of sending a message results in a Verbol command being generated. This Verbol command "wraps" the message contents, and is recorded in the history of the Verbol chat by the Verbol chat controller.

In addition to sending comments, topic room participants can tie their browser displays to the display of another participant, in effect "following" that "leader" around as she or he browses content. In this mode, the leader's Ibook controller generates Verbol messages that specify where the "leader" is browsing. These Verbol messages are sent to the chat room. Any other participants you have become followers can follow the leader by having the topic room send the leader's Verbol messages to each follower's Ibook controller. When a follower's Ibook controller receives such a Verbol message, it will direct the follower's browser to browse to the same location as the leader.

Participants in chat rooms have, or can have, roles (see Roles above).

Fundamentally, Verbol chat generally comprises: a) participants who use Verbol to participate in the chat room and make contributions to the Ibook; b) a history log of all the Verbol commands for those interactions and contributions; c) a mechanism for capturing and displaying those Verbol scripts; d) a mechanism for listing the participants; e) a mechanism for storing, searching, and locating those histories, and episodes within those histories; and f) a mechanism for animating the Verbol histories (that is, a means of executing the logged Verbol commands so as to recreate the history of the Verbol conversation and contributions).

Searching Verbol Histories

Verbol chat logs can be scanned and filtered based on the properties of the Verbol commands in the logs. Some of the properties that can be combined to search or filter the logs include the name of the topic room, the name of the participants in a chat, the temporal characteristics of the script elements (time, date, duration, etc.), the types of roles played by the participants, the nature and effect of the Verbol commands that comprise the logs, and location properties of the content and messages contributed in the log.

Voice Chat

As discussed above, in order to log into an Ibook site, an Ibook site member may be required to launch an Ibook controller. The version of Ibook controller used with topic rooms may include an "audiorecorder" controller or audiorecorder. The audiorecorder helps contributors record, markup, save, and playback audio material, including material spoken by the user. The audiorecorder is software that controls standard audio, multimedia, and/or telephony hardware on the contributor's computer.

Using the audiorecorder, audio content can be added to an Ibook folder. This audio content is added as "external content" as described above. Such a page is called an "audiopage".

More particularly, recorded audio content can be downloaded to the server that is hosting an Ibook site. An Ibook page can be created whose itag points to the external audio content (this is the audio page). Using the audiorecorder, istamps that designate specific locations and/or regions in the audio recording can be added to the audio page. These istamps are called "index points". When a user clicks on an index point in an audiopage, the audio content beginning at the designated location, or within the designated region, will be played back for the user.

In one embodiment, the MySharer software is used to transfer audio content from a participant's machine to the Ibook site. In this embodiment, each participant specifies through the MySharer software that they want a particular file folder on their computer to be regularly updated and synchronized with a corresponding folder on the Ibook site. Each participant may specify that their audiorecorder is to drop audio files into their local copy of the shared folder. When a person makes a recorded comment in the topic room, an audio file with a recording of their comment is placed in their local copy of the shared folder. The MySharer software may then copy that file into the Ibook site synchronized folder. From there, the MySharer software may propagate a copy of the recorded comment to the corresponding folder on each participant's computer.

Software Usage

The following explains how to integrate one specific embodiment of a standalone audiorecorder, the MySharer software, and chat, to record, send, and play back voice messages while communicating with people in a chat room. When a topic room member creates a recording, it will be created in a directory selected by the member. This directory is specified as part of a MySharer mapping. The MySharer software will therefore upload the recording file to a selected Ibook folder. When the MySharer software has uploaded the file, a message may be displayed in the Ibook chat window. This message may be selected by the member to link to the file in the chat window, and the file will play.

To use voice chat:

1. Create a MySharer mapping—This enables the MySharer software to upload the wave file of your recording to an Ibook site (e.g., free.familysystems.org).

2. Start Ibook chat—This enables the user to see that the MySharer software has carried out the upload request, and to click on a link to the wave file to play it back.

3. Create a recording using audiorecorder—Record your voice input, using for example an external mike attached to your PC's sound card.

A user needs to create the mapping between the directory on his or her client computer in which the audio recordings are saved and a MySharer directory on an Ibook site (e.g., free.familysystems.org) If an appropriate mapping already exists, then this is not necessary.

To create a mapping, a user may:

1. Start the MySharer software (e.g., build 138, which is part of build 144 of the Ibook controller).

2. Click MySharer/Options—the MySharer options dialog is displayed.

Figure 6:
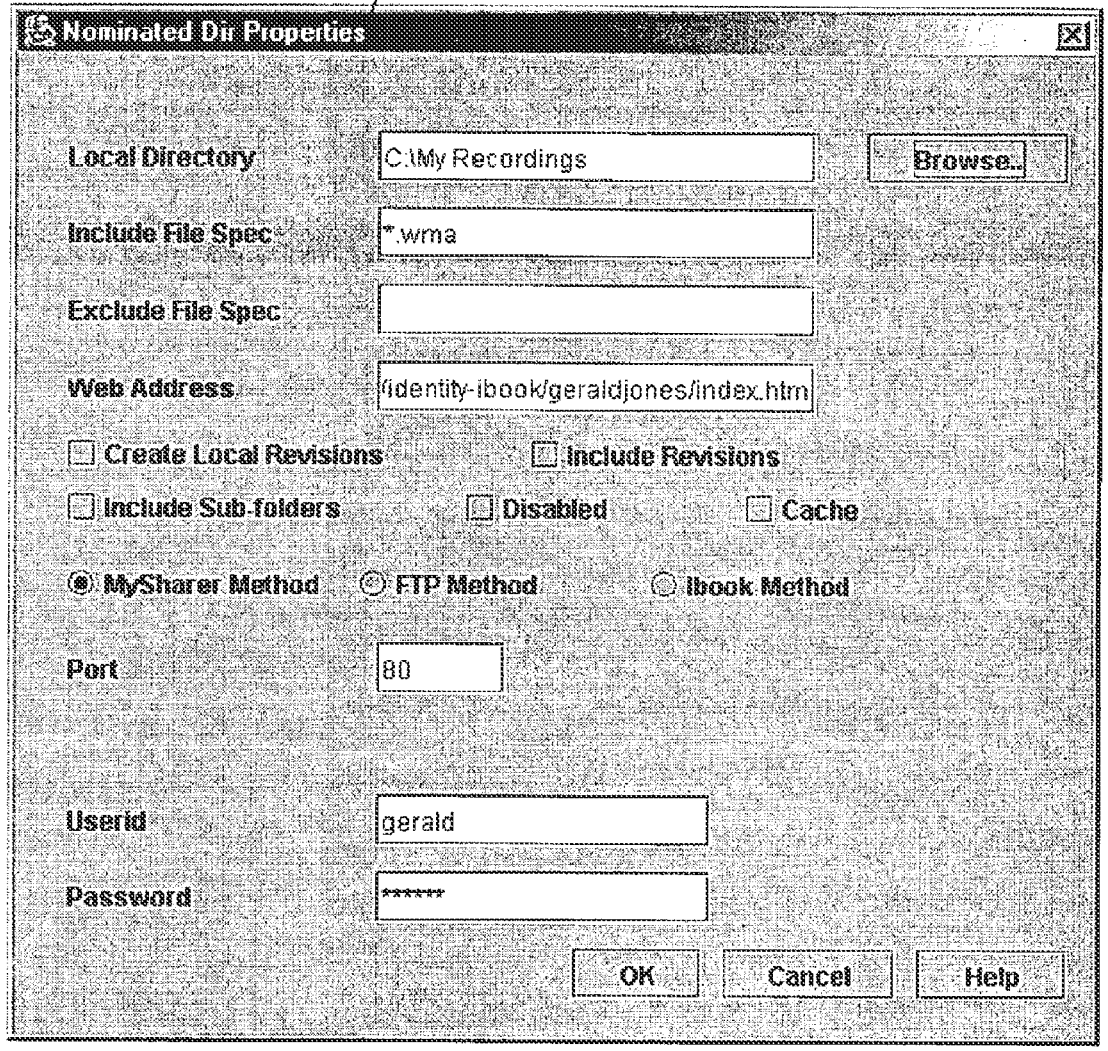
FIG. 6 shows an illustrative MySharer window in accordance with the present invention.

3. Click the Add to create a new mapping. A "Nominated Dir Properties" window may be displayed. FIG. 6 shows an illustrative "Nominated Dir Properties" window 7000.

4. In the field local directory, enter the name of directory from which the voice messages will be uploaded. This may be performed by using the browse button to select the directory, or if a standalone audiorecorder is running, highlight the path (such as C:\My Recordings) in the recordings directory field in the Audio Recorder window, and press the keys Ctrl+C to copy this value to the Windows clipboard, then press Ctrl+V to paste it into the Local Directory field.

5. in the field Web Address, enter the full web address of his or her Ibook folder. The user should make sure, for example, that he or she has enrolled on free.familysystems.org—the user should then have an identity Ibook folder in their name. The user may open his or her Ibook folder, and click the MySharer Ibook folder link in his or her identity Ibook folder. The URL should now look like this: http://free.familysystems.org/identity-ibook/myname/mysharer/myfilelist.htm. The user may copy the path of this URL (excluding the filename myfilelist.htm) and paste it into the Web Address field in the "Nominated Dir Properties" window. For example, copy: http://free.familysystems.org/identity-ibook/myname/mysharer.

6. Enter his or her user ID and password for his or her identity Ibook folder in the Userid and Password fields.

7. Click apply to apply your changes.

8. Click the general tab and make sure that the send chat messages check box is selected. Set update, for example, to one minute.

9. Click OK to save the changes to the general tabset and exit from the MySharer options window.

10. To enable the MySharer software to automatically upload his or her files from the nominated directory at the specified interval, click start on the MySharer window.

To start Ibook chat, a user may:

1. Start the Ibook controller, go to the chat menu, and connect to the chat server (e.g., the free.familysystems.org server, and the chat room is talk). The chat room is displayed. FIG. 7 shows an illustrative chat room window 8000.

2. Make sure that Verbol commands are shown (To check if Verbol commands are shown, click menu and then options on the chat room window. The options dialog is displayed. Make sure the show Verbol commands check box is checked.)

3. Each time the MySharer software uploads the voice message files, see, in the chat room window, a "MySharer has updated" message against the name of a user. Below it, there will be a link to the voice message. The user may click the link to play back the voice message.

To start a recording, a user may:

1. Record his or her voice message. This may be done with an external microphone connected to the client computer's sound card.

Figure 8:
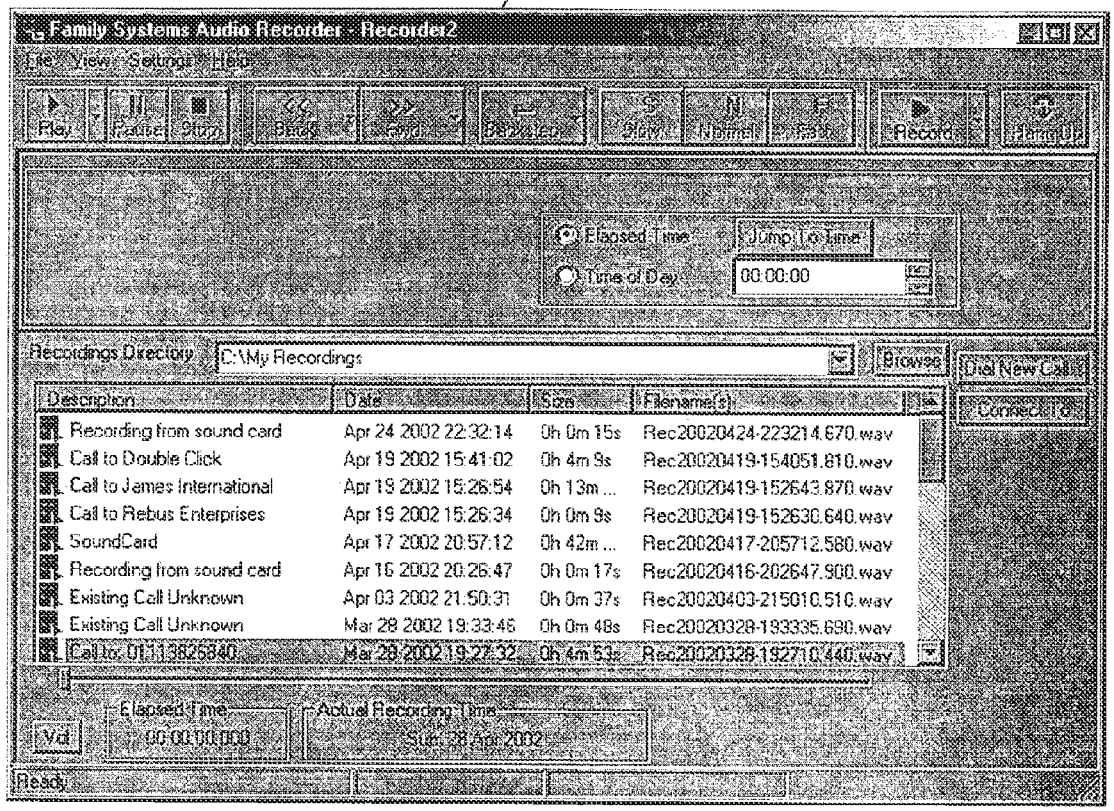
FIG. 8 shows an illustrative audiorecorder window in accordance with the present invention.

2. Start the standalone audiorecorder (e.g., build 27) by for example clicking Start>Programs>Audio Recorder V.1.0.27>Standalone Audio Recorder. FIG. 8 shows an illustrative audiorecorder window 9000.

3. Choose the directory where he or she wants to store the voice messages. The default illustrated in FIG. 8 is C:\My Recordings, but any suitable directory may be selected.

4. Using his or her microphone to record your message, click the record button to start recording and click stop to finish it. The recording will be saved in the chosen directory and the MySharer software will copy the file to the chosen Ibook folder, and send a message to Ibook chat.

Topic Room Properties

Every topic room page may have its own set of rights and privileges, which may be determined by some of the statements in its Verbol script. Every Ibook site member may have his or her own rights and privileges, which are specified in that member's identity. Many roles carry with them certain rights, privileges, and constraints, which are specified in the role.

The final rights, privileges, and constraints of a participant in a chat room are determined by a well-defined composition of the rights, privileges, and constraints specified in the topic room folder, the participant's identity Ibook folder, and the participant's current Persona, if any.

Verbol

A. Behavior of Ibook Objects

The behavior of an Ibook folder is the composition of the behavior of that Ibook folder's pages. The behavior of an Ibook page is defined by the Verbol script in the vspace of the page's itag.

B. The Verbol Architecture

The Verbol architecture is an architecture for creating, sustaining, and supporting communication between independent, distributed, self-regulating, cooperating objects. An object designed to exhibit some interesting or useful behavior within the Verbol architecture is called a Verbol object. Verbol objects exhibit their behavior when they are activated within a virtual computing environment called the Verbol minimum operating environment. The behavior of Verbol objects is specified in Verbol scripts associated with those objects. Verbol objects have two types of behavior: they exchange messages with other Verbol objects, and they control non-Verbol objects.

Within the Verbol minimum operating environment, Verbol objects may communicate with each other using any language they like. Obviously, objects that don't understand the same language can't communicate effectively, so useful interaction between Verbol objects only occurs when the objects that are trying to communicate employ the same language. Colloquially, it may be said that Verbol objects "speak a Verbol language," but two perfectly legitimate Verbol objects may understand completely different languages, and be utterly unable to communicate. On the other hand, the behavior of a single Verbol object, as found in the Verbol script for that object, could be specified in a language that only that object understood.

A Verbol object may use a Verbol interpreter to analyze and process its scripts and any Verbol messages it receives. The Verbol interpreter, in turn, may make use of a Verbol grammar to parse the messages and scripts, and a Verbol processor to process the parsed messages and scripts. The language that a Verbol object understands may be completely determined by the Verbal interpreter and the Verbol grammar that it uses to analyze and process its scripts and messages.

Therefore, two Verbol objects can communicate reliably if and only if they use the same, or compatible, Verbol interpreters and grammars.

Topic rooms, Ibook folders and pages, istamps, the Ibook controller, and the Verbol chat controller are all Verbol objects. They are called Verbol Ibook objects.

The Ibook controller may contain a Verbol minimum operating environment. The Ibook controller places each verbal Ibook object it holds into its Verbal minimum operating environment, thereby activating the object and endowing it with the behavior specified by its script.

Verbal Ibook objects may all speak a language referred to as the Verbol standard Ibook language. Verbol Ibook objects may use the Verbol standard Ibook language both for the messages they send and receive, and for the scripts that define their behavior.

Verbol Ibook objects may all speak the same language because they all use the same Verbol interpreter and grammar. The Verbol interpreter they use is called the Verbol standard Ibook interpreter, and the grammar is called the Verbol standard book grammar.

C. Verbol Architecture Design Principles

Verbol objects may control all their own behavior (including all copies). Verbol objects may inherit all contributed behavior Verbol objects are called by their name. Each Verbol object may be its own class. A Verbol wrapper can be created for any non-Verbol object.

D. The Verbol Minimum Operating Environment

Every object may inherit the ability to interpret Verbol. The Verbol minimum operating environment may be responsible for a) creating, maintaining, running, and terminating Verbol objects; b) passing messages between Verb objects; and c) mapping Verbol names to specific Verbol objects, and for locating those objects.

The Verbol minimum operating environment is a non-Verbol object. Like all non-Verbol objects, it can be given a Verbol wrapper. One embodiment of the Verbol minimum operating environment for Ibook folders is implemented in Java.

E. The Verbol Standard Ibook Language

There are two types of statements in the Verbol standard Ibook language: "listening statements" and "action statements" (sometimes referred to as "imperative statements"). There are two common listening statements: the "whenever" statement and the "for" statement.

The whenever statement, as discussed above, has the following form: Whenever <event pattern> <action pattern>. When an Ibook page is loaded, the Ibook controller may execute all of the whenever statements in the page's vspace. Each whenever statement represents a condition for which the controller is to "listen", and an action to be taken if that condition is found. The actions are Verbol action statements. When an action is to be taken, the corresponding Verbol action statement is executed.

The for statement has the following form: For <action pattern> <vspace designator>. Whenever a Verbol object receives a command (a Verbol action statement), it may search for either a whenever statement whose event pattern matches the Verbol action, or a for statement whose action pattern matches the Verbol action. If a matching for statement is found, the Verbol script in the designated vspace is scanned to "resolve" the action to be taken to execute the action statement being processed. The vspace designator may be an expression that typically resolves to another Ibook page.

Commonly used Verbal action statements may include for example: a) copy [in/to] < ibook>/own book; b) play <audiopage istamp>; and c) create <new page name> [based on] <template specifier>.

Computer Program Listing Appendix

The computer program listing appendix submitted on two copies (i.e., copy 1 and copy 2) of a compact disc includes build instructions in java source code for partial embodiments of the methods described above.

The foregoing is merely illustrative of the principles of this invention and various modifications can be made by those skilled in the art without departing from the scope and spirit of the invention.

What is claimed is:

1. A method for providing a topic room, the method comprising:

recording audio utilizing a first computer, the first computer participating in a topic room with a second computer over a network, the topic room comprised of web-accessible audio and shared chat messages including references to index points of the web-accessible audio;

adding the recorded audio to the web-accessible audio;

generating index points of the recorded audio on the first computer or a server computer;

generating references to the index points of the recorded audio;

communicating the references in chat messages to the second computer participating in the topic room, wherein the references are communicated as textual information; and enabling selection of one of the chat messages by the second computer to play back the recorded audio on the second computer based on a corresponding index point referenced in the selected chat message, wherein the second computer accesses the recorded audio from the web-accessible audio, wherein the second computer is capable of replying to the recorded audio through the topic room by recording additional audio.

2. The method of claim 1, further comprising replying to the recorded audio by creating additional recorded audio utilizing the second computer.

3. The method of claim 2, further comprising:
generating additional references to index points of the additional recorded audio;
communicating the additional references in chat messages to the first computer; and
enabling selection of one of the chat messages by the first computer to play back the additional recorded audio on the first computer based on a corresponding index point referenced in the selected chat message, wherein the first computer accesses the additional recorded audio from the web-accessible audio.

4. The method of claim 1, further comprising creating one or more of recorded video, multimedia, HTML content, Microsoft Word documents, PDF documents, faxes, spreadsheets, text, two-dimensional graphics, three-dimensional or n-dimensional graphics, animation, source code, and executable code to accompany at least a portion of the recorded audio.

5. The method of claim 1, wherein the recorded audio is accompanied by one or more of recorded video, multimedia, HTML content, Microsoft Word documents, PDF documents, faxes, spreadsheets, text, two-dimensional graphics, three-dimensional or n-dimensional graphics, animation, source code, and executable code.

6. The method of claim 5, wherein one or more links to index points of the recorded audio are included within the HTML content.

7. The method of claim 1, wherein the index points are stored on the first computer.

8. The method of claim 1, wherein the index points are stored on a server.

9. The method of claim 1 further comprising enabling the recorded audio to be accessible from the index points on a server.

10. The method of claim 1 further comprising communicating the references in chat messages from the first computer to a plurality of other computers at substantially the same time.

11. The method of claim 1 further comprising:
maintaining a log of chat messages between the first computer and the second computer; and
playing back the chat messages from the log to reproduce recorded chat room interactions.

12. The method of claim 1 further comprising dividing the recorded audio into a plurality of smaller audio clips.

13. A method for providing a topic room, the method comprising:
storing recorded audio at a server, wherein the server provides a topic room comprised of web-accessible audio and shared chat messages including references to index points of the web-accessible audio, and wherein the recorded audio is added to the web-accessible audio;
storing an index point of the recorded audio on the server;
generating a reference to the index point of the recorded audio;
communicating the reference in a chat message to a second device participating in the topic room, wherein the reference is communicated as textual information, and wherein selection of the chat message by the second device enables a user of the second device to play the recorded audio starting from the index point referenced in the chat message; and
receiving a reply to the recorded audio through the topic room from the second device, wherein the reply comprises additional recorded audio by the user of the second device, and wherein the additional recorded audio is added to the web-accessible audio.

14. The method of claim 13 further comprising creating one or more of recorded video, multimedia, HTML content, Microsoft Word documents, PDF documents, faxes, spreadsheets, text, two-dimensional graphics, three-dimensional or n-dimensional graphics, animation, source code, and executable code to accompany at least a portion of the recorded audio.

15. The method of claim 13, wherein the recorded audio is accompanied by one or more of recorded video, multimedia, HTML content, Microsoft Word documents, PDF documents, faxes, spreadsheets, text, two-dimensional graphics, three-dimensional or n-dimensional graphics, animation, source code, and executable code.

16. The method of claim 15, wherein one or more links to index points of the recorded audio are included within the HTML content.

17. A method for accessing audio through a topic room, the topic room comprised of web-accessible audio and shared chat messages including references to index points of the web-accessible audio, wherein a first computer and a second computer participate in the topic room over a network, the method comprising:
receiving, at the second computer, a chat message from the first computer having a reference to an index point of recorded audio, wherein the reference is received as textual information;
accessing the recorded audio from the web-accessible audio;
playing the recorded audio at the second computer starting from the index point referenced in the chat message in response to a user selection of the chat message; and
replying to the recorded audio through the topic room by recording additional audio using the second computer, wherein the additional recorded audio is added to the web-accessible audio.

18. The method of claim 17 further comprising creating one or more of recorded video, multimedia, HTML content, Microsoft Word documents, PDF documents, faxes, spreadsheets, text, two-dimensional graphics, three-dimensional or n-dimensional graphics, animation, source code, and executable code to accompany at least a portion of the recorded audio.

19. The method of claim 17, wherein the recorded audio is accompanied by one or more of recorded video, multimedia, HTML content, Microsoft Word documents, PDF documents, faxes, spreadsheets, text, two-dimensional graphics, three-dimensional or n-dimensional graphics, animation, source code, and executable code.

20. The method of claim 19, wherein one or more links to index points of the recorded audio are included within the HTML content.

* * * * *